US009579997B2

(12) United States Patent
Eckhoff et al.

(10) Patent No.: US 9,579,997 B2
(45) Date of Patent: Feb. 28, 2017

(54) DEVICE FOR SELECTIVELY CONTROLLING AND REDUCING THE BACKWARD DISPLACEMENT OF A VEHICLE SEAT IN THE EVENT OF AN ACCIDENT

(71) Applicant: Johnson Controls Metals and Mechanisms GmbH & Co. KG, Solingen (DE)

(72) Inventors: Sascha Eckhoff, Leichlingen (DE); Thomas Kaestner, Solingen (DE)

(73) Assignee: Johnson Controls Metals and Mechanisms GmbH & Co. KG, Solingen (DE)

( * ) Notice: Subject to any disclaimer, the term of this patent is extended or adjusted under 35 U.S.C. 154(b) by 3 days.

(21) Appl. No.: 14/365,343

(22) PCT Filed: Nov. 29, 2012

(86) PCT No.: PCT/EP2012/073934
§ 371 (c)(1),
(2) Date: Jun. 13, 2014

(87) PCT Pub. No.: WO2013/087415
PCT Pub. Date: Jun. 20, 2013

(65) Prior Publication Data
US 2014/0339863 A1    Nov. 20, 2014

(30) Foreign Application Priority Data

Dec. 16, 2011    (DE) .................. 10 2011 056 572
May 16, 2012    (DE) .................. 10 2012 104 277

(51) Int. Cl.
*B60N 2/42*    (2006.01)

(52) U.S. Cl.
CPC ......... *B60N 2/4228* (2013.01); *B60N 2/4249* (2013.01); *B60N 2/4256* (2013.01)

(58) Field of Classification Search
CPC .... B60N 2/4214; B60N 2/42736; B60N 2/42; B60N 2/427
See application file for complete search history.

(56) References Cited

U.S. PATENT DOCUMENTS 3,578,376 A * 5/1971 Hasegawa ............... B60N 2/07
                                                296/68.1
6,176,543 B1 * 1/2001 Nawata ............... B60N 2/1615
                                                296/187.11
(Continued)

FOREIGN PATENT DOCUMENTS

CN        22 32 370 Y     8/1996
CN      101 98 7588 A     3/2011
(Continued)

*Primary Examiner* — Philip Gabler
(74) *Attorney, Agent, or Firm* — McGlew and Tuttle, P.C.

(57) ABSTRACT

A device for selectively monitoring and reducing a backward displacement of a vehicle seat in the event of an accident, having at least one stop element (4) which arranged on a pair (1) of seat rails and has a stop face (5) which is inclined with respect to a longitudinal axis of the pair (1) of seat rails, and having at least one stop body (6) which is arranged on the vehicle seat, having a contact face (8) which is arranged in a normal position at a distance from the stop face. In order to make available a device which efficiently reduces a backward displacement movement of a motor vehicle seat in a simple way in the event of an accident of the motor vehicle, there is provision that the stop element (4) and the stop body (6) are embodied and arranged with respect to one another in the mounted state in such a way that in a crash position which occurs in a tail-end impact with a motor vehicle having the vehicle seat, the stop face (5) of the stop element (4) and the contact face (8) of the stop (Continued)

body (6) enter into contact and as a result the backward displacement of the vehicle seat which is caused by the accident is reduced.

20 Claims, 4 Drawing Sheets

(56) References Cited

U.S. PATENT DOCUMENTS

| | | | |
|---|---|---|---|
| 6,276,650 B1 | 8/2001 | Kojima et al. | |
| 7,195,311 B2* | 3/2007 | Kuliha | B60N 2/071 297/216.1 |
| 7,731,281 B2* | 6/2010 | Kurita | B60N 2/015 248/429 |
| 2002/0033625 A1* | 3/2002 | Goy | B60N 2/0705 297/344.18 |
| 2010/0140991 A1* | 6/2010 | Hassler | B60N 2/0705 297/216.13 |

FOREIGN PATENT DOCUMENTS

| | | |
|---|---|---|
| DE | 199 22 626 A1 | 12/2000 |
| DE | 10 2006 044757 A1 | 4/2008 |
| DE | 20 2007 009795 U1 | 6/2008 |
| DE | 10 2007 039862 A1 | 2/2009 |
| EP | 1 188 603 A1 | 3/2002 |
| EP | 2 279 899 A2 | 2/2011 |
| FR | 2 920 358 A1 | 3/2009 |
| JP | H11-115594 A | 4/1999 |
| JP | 2000-094998 A | 4/2000 |
| JP | 2006-282019 A | 10/2006 |
| JP | 2007 320385 A | 12/2007 |
| JP | 2009 208737 A | 9/2009 |
| JP | 2011-031652 A | 2/2011 |
| WO | 2009/143942 A1 | 12/2009 |

* cited by examiner

DEVICE FOR SELECTIVELY CONTROLLING AND REDUCING THE BACKWARD DISPLACEMENT OF A VEHICLE SEAT IN THE EVENT OF AN ACCIDENT

CROSS REFERENCE TO RELATED APPLICATIONS

This application is a United States National Phase Application of International PCT/EP2012/073934 filed Nov. 29, 2012 and claims the benefit of priority under 35 U.S.C. §119 of German Patent Application DE 10 2011 056 572.8 filed Dec. 16, 2011, and the benefit of priority under 35 U.S.C. §119 of German Patent Application DE 10 2012 104 277.2 filed May, 16 2012, the entire contents of which are incorporated herein by reference.

FIELD OF THE INVENTION

The invention relates to a device for selectively controlling and reducing a backward displacement of a vehicle seat in the event of an accident, having
at least one stop element arranged on a pair of seat rails that has a stop face which is inclined with respect to a longitudinal axis of the pair of seat rails, and
at least one stop body which is arranged on the vehicle seat having a contact face which is arranged in a normal position at a distance from the stop face.

BACKGROUND OF THE INVENTION

In the event of traffic accidents, in particular with tail-end impact accidents of motor vehicles, there is the danger that the vehicle seat due to the arising forces performs a backwards downward movement, that is, in the direction of the rear of the vehicle and vehicle floor with respect to the installation position of the vehicle seat in a vehicle. As a result, there is a specific danger for the persons present in the vehicle. On the one hand there is the danger that the vehicle seat is loosened at least partially from the seat rail system or that the latter is deformed, whereby the uncontrolled movements of the vehicle seat caused thereby endanger the person present on the vehicle seat and others present in the vehicle. In addition, there is a displacement of the person located on the vehicle seat, such that the safety systems, for instance airbag and seatbelt, can no longer optimally fulfill the function thereof.

A few devices are known from the prior art which effect a stabilization of a vehicle seat on a pair of seat rails and should prevent a backward displacement of the vehicle seat in the event of a crash. All known devices are based on different, in each case, highly complex mechanisms having several movable components, wherein a movement sequence of these components is typically triggered by mechanical or electronic signals which leads to a locking or fastening of the vehicle seat at the vehicle structure or at a pair of seat rails supporting the seat.

An essential disadvantage of these devices lies in the necessity of triggering those mechanisms by external signals, the complexity of the mechanisms and of the movable components of the locking mechanisms, because the movement thereof leads on the one hand to a certain time delay of the locking of the vehicle seat after an accident triggering the mechanism, and on the other hand with increasing complexity of the mechanisms the failure rate increases and the reliability correspondingly decreases.

SUMMARY OF THE INVENTION

The invention is based on the object to provide a device which efficiently reduces a backward displacement movement of a motor vehicle seat in a simple way in the event of an accident of the motor vehicle, and without use of active movable components.

This object is solved according to the invention by a device having at least one stop element arranged on a pair of seat rails that has a stop face which is inclined with respect to a longitudinal axis of the pair of seat rails. At least one stop body is arranged on the vehicle seat having a contact face which is arranged in a normal position at a distance from the stop face. The stop element and the stop body are designed and arranged in the mounted state with respect to each other so that in a crash position which occurs in the event of a tail-end impact with a motor vehicle having the vehicle seat, the stop face of the stop element and the contact face of the stop body enter into contact. As a result, the backward displacement of the vehicle seat which is caused by the accident is prevented or at least reduced.

Advantageous further developments of the invention are specified in the dependent claims.

The device according to the invention for selectively controlling and reducing a backward movement of a vehicle seat in the event of an accident comprises at least one stop element arranged on a pair of seat rails that has a stop face which is inclined with respect to a longitudinal axis of the pair of seat rails. The device according to the invention further comprises at least one stop body arranged on the vehicle seat having a contact face which in a normal position of the vehicle seat is arranged at a distance from the stop face. The stop element and the stop body are designed and arranged in the mounted state with respect to each other so that in a crash position which occurs in the event of a tail-end impact with a motor vehicle having the vehicle seat, the stop face of the stop element and the contact face of the stop body enter into contact, and as a result the backward displacement of the vehicle seat which is caused by the accident is prevented or at least reduced.

Here, in the event of a crash, the device according to the invention causes an advantageous limiting of the possible movement path of the vehicle seat, whereby a collapse of the seat in the event of a vehicle accident is prevented. Additionally, it is hereby guaranteed that a person present on the vehicle seat remains in a position in which the risk of injury to the person in the event of an accident is significantly reduced. In particular, due to the device according to the invention it is guaranteed that the person remains in a position relative to the safety systems of the motor vehicle, for instance belt or airbag, in which these can fulfill the function thereof without impairment.

Furthermore, the additional support between the stop face of the stop element and the contact face of the stop body allows a further improvement of the transfer of forces occurring in the event of a crash from the vehicle seat to the vehicle structure, which leads to a reduction of the load on the remaining components of the seat fastening.

The stop element and/or the stop body can in principle be composed of any material, preferably however these are made of the same material as the pair of seat rails or from a material of the seat structure.

Here, the stop element and/or the stop body can be comprised of an individual component or can be made from a plurality of construction elements. It is also conceivable that the component, which forms the stop element and/or the stop body, has further functions, for instance forms a part of a supporting structure or the vehicle safety equipment.

At least one side of the stop element is designed as a stop face that in a crash position which occurs in the event of an accident comes into contact with at least one side of the stop body, which is called a contact face. In regular operation, the stop face of the stop element, as well as the contact face of the stop body are arranged in a normal position at a distance from each other, free of contact. Only an application of force on the vehicle seat caused by an accident leads to a transition from the normal position into the crash position.

Here, the device according to the invention for selectively controlling and reducing the backward displacement of a vehicle seat in the event of an accident, is attached at least to one pair of seat rails of the vehicle seat. An arrangement on both pairs of seat rails of the vehicle seat is also possible which leads to an improved stabilization of the vehicle seat in the event of a tail-end impact accident, and guarantees an improved transfer of forces caused by the accident from the vehicle seat to the vehicle structure.

In principle the stop face and/or the contact face can be designed to have any shape. In a particularly preferred embodiment the stop face and/or the contact face are however both designed flat.

According to a further preferred embodiment of the invention, the shape of the contact face is formed corresponding to the shape of the stop face, so that in the event of a transition of the vehicle seat into the crash position in the event of a tail-end impact on the motor vehicle, the stop face of the stop element and the contact face of the stop body come into full face contact to the greatest extent possible. Due to the extensive and uniform surface contact between the stop face and the contact face, even in the event of a certain shift of the two components relative to each other in the longitudinal direction of the seat rails caused by an accident, it is guaranteed that a uniform transfer of the forces caused by the accident occurs from the vehicle seat to the stop element, and the backward displacement of the seat can be selectively intercepted.

In addition, the surface structure of the stop face can in principle have any shape. According to a further development of the invention however, the stop face has a rough surface structure, which in an advantageous manner increases the static friction of the two components during impact with each other in the event of a crash.

According to a further development of the invention the stop face is inclined with respect to the longitudinal axis of the pair of seat rails by 15° to 55°, preferably by 25° to 45°, particularly preferably by 35°. Here, the incline of the stop face with respect to the installation position of the seat rails of a vehicle seat in a vehicle proceeds decreasing with respect to the travel direction, whereby it is guaranteed in a simple manner that the forces transferred from the contact face to the stop face with a backward displacement of the vehicle seat in the event of an accident are received efficiently and in a controlled manner, and the two faces are reliably prevented from slipping away from each other.

The contact face and the stop face according to an advantageous embodiment of the invention are arranged in the normal position parallel and at a small distance to each other, whereby in the event of a crash a full face contact is guaranteed to the greatest extent possible, as quickly as possible.

According to an advantageous embodiment of the invention it is provided that the stop body is formed integrally with a component of a vehicle seat frame of the vehicle seat, preferably integrally by beading a seat link of the vehicle seat. Hereby, in an advantageous way it is guaranteed on the one hand that the stop body is inseparably connected to the component of the vehicle seat frame, and on the other hand a cost effective and simple production and assembly of the stop body is hereby possible. Furthermore it is conceivable that the stop element is connected in a form-locking and/or bonded manner to the pair of seat rails and/or the stop body is connected in a form-locking and/or bonded manner to a component of the vehicle seat, for instance a seat link or the seat frame. Alternatively known fastening means, for instance, screws, bolts, rivets, or pins can also be used.

According to a further, advantageous further embodiment of the invention it is provided that the stop element has a further retaining element. This retaining element can also serve for stabilizing the seat in the event of a crash, or support a further construction element of the vehicle, or respectively the seat, for instance parts of the safety belt system, an arm rest or any other retainer.

According to a particularly advantageous further embodiment of the invention, it is provided that the stop body has a hole-like recess in the region of the contact face, and that the stop element has a pin projecting from the stop face which are designed and arranged so that the pin projecting from the stop face in the crash position engages in the hole-like recess of the stop body in the region of the contact face, whereby the backward displacement of the vehicle seat is prevented or at least reduced particularly effectively. The engagement of the pin in the hole-like recess extremely effectively prevents, in a simple manner, in the event of a crash that the contact face and the stop face slip off each other which, in particular, is advantageous in severe accidents in which a strong deformation or even a ripping out of the vehicle seat from the pair of seat rails can occur.

According to a further embodiment of the invention, due to a mechanical interaction between the stop body and the stop element by means of engagement of the pin in the hole-like recess, in the event of a tail-end impact on the motor vehicle, additionally a lateral slip of the vehicle seat beyond the pair of seat rails is prevented. In an alternative further embodiment of the invention, the same advantageous effect can be attained also by an angled arrangement of the stop body with respect to the stop element. With both embodiments, a lateral stabilization of the vehicle seat is attained orthogonal to the direction of the progression of the pair of seat rails, whereby a particularly controlled transfer of the forces due to an accident from the vehicle seat to the remaining vehicle structure is guaranteed.

According to an advantageous further embodiment of the invention, the stop element has a deformation zone preferably in the shape of a recess which after a transition from the normal position into the crash position, causes a subsequent deformation of the stop element and thus, due to selective energy management leads to a reduction of the acceleration forces acting on the vehicle seat, whereby the risk of injury to a passenger on the vehicle seat is significantly reduced.

The recess preferably penetrates through more than half of the length of the stop element in the direction parallel to the adjustment direction of the pair of seat rails. The recess very particularly preferably penetrates nearly the entire length of the stop element parallel to the adjustment direction of the pair of seat rails. The cross-sectional area of the recess, orthogonal to the adjustment direction of the pair of seat rails, can in principle have any shape, however according to an advantageous further embodiment of the invention is designed diamond-shaped.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
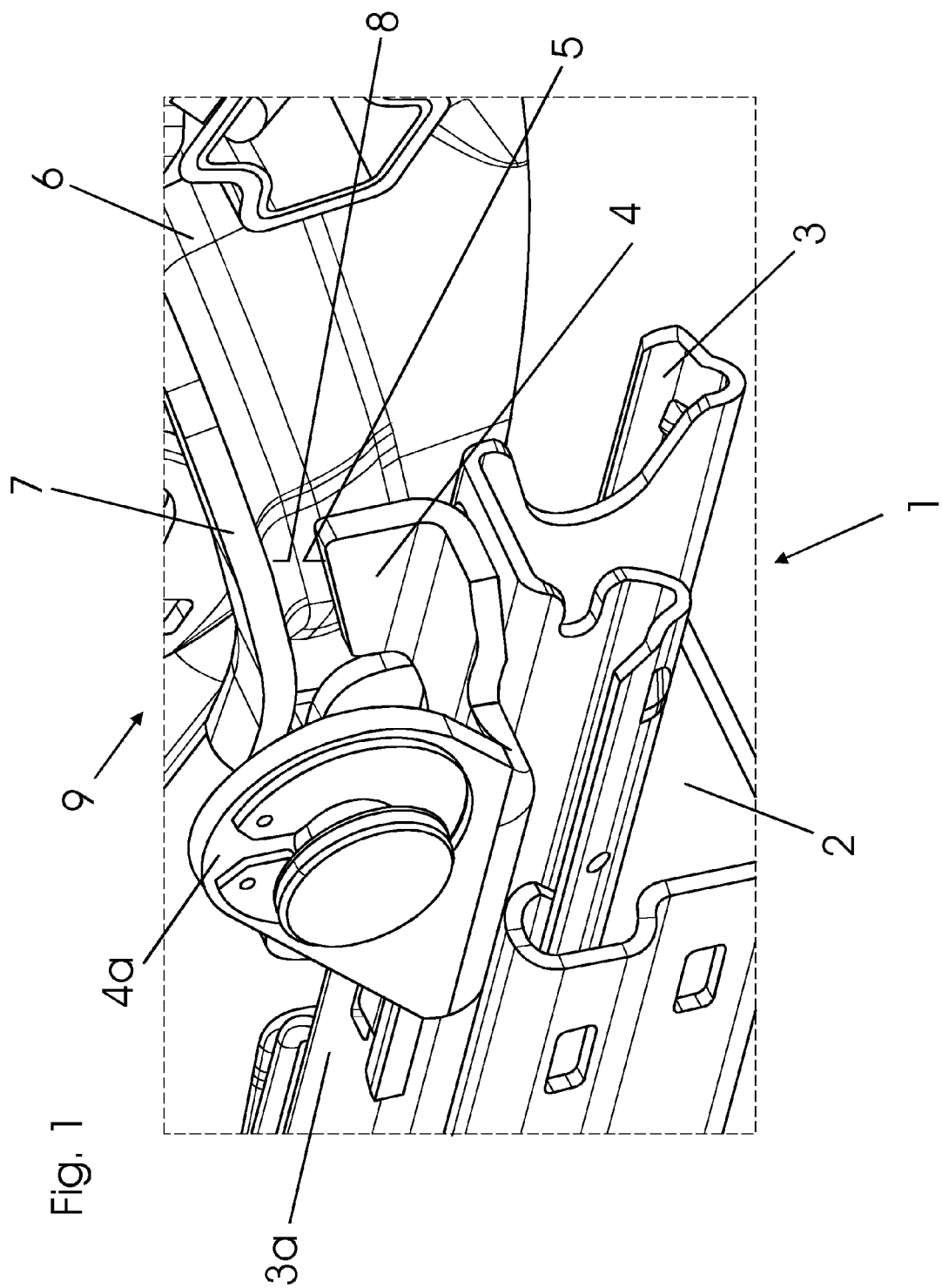
FIG. 1 is a perspective partial view of one embodiment of a stop element on a pair of seat rails and a stop body on a seat link belonging to a vehicle seat.

Referring to the drawings in particular, an embodiment of a device, represented in FIG. 1, for selectively controlling and reducing a backward displacement of a vehicle seat in the event of an accident, has a stop element 4 arranged on a top 3a of an upper seat rail 3 of the vehicle seat, and a corresponding stop body 7 formed on a seat link 6 of the vehicle seat.

Here, the vehicle seat is attached to a pair 1 of seat rails which are comprised of a lower seat rail 2 securely connected to the vehicle structure and the upper seat rail 3, which supports the vehicle seat, arranged movable on the lower seat rail 2.

The metal stop element 4 is securely screwed to the top 3a of the upper seat rail 3, wherein it is designed as a multifunctional body having a further retaining element 4a for fastening a component of a safety belt system of the vehicle seat.

The stop element 4 has a planar stop face 5 with a smooth surface structure, and is arranged at an angle of 35° relative to the surface 3a of the upper seat rail 3. The stop body 7 is designed integrally from a seat link 6 of the vehicle seat frame 9 as a beading, and has a planar contact face 8 on the bottom side of the beading.

The contact face 8 of the stop body 7 is designed corresponding to the stop face 5 of the stop element 4, wherein the contact face 8, as shown in FIG. 1, is inclined according to the angle of the stop face 5, likewise by an angle of 35° to the upper seat rail 3. Thus, the contact face 8 and the stop face 5 contact full face in the event of a lowering and/or backward displacement of the vehicle seat due to an accident.

In contrast, the contact face 8 and the stop face 5 in the assembled, operationally ready state, of the normal position, do not contact each other. In the event of a traffic accident, particularly in a tail-end impact, the seat link 6 with the vehicle seat accelerates in the direction of the rear of the vehicle and simultaneously in the direction of the vehicle floor. Here, the contact face 8 comes into contact with the stop face 5, wherein this state is defined as the crash position. Here, a force transfer occurs between the contact face 8 and the stop face 5 from the vehicle seat to the vehicle structure, wherein the maximum possible movement path of the vehicle seat due to forces caused by the accident is shortened, and thus the transfer of kinetic energy to the vehicle seat is reduced.

Due to the angled arrangement of the stop face 5 on the stop element 4, and the contact face 8 to the stop body 7, it is guaranteed that in the event of a crash, the seat undergoes a movement controlled to the greatest extent possible which is limited essentially to a minimal downwards and backwards movement relative to the installation position of the vehicle seat in the vehicle, whereby a person present on the vehicle seat remains positioned such that safety equipment, for instance a safety belt or airbag, present in the vehicle can fulfill the function thereof.

In addition, the stop element 4 is designed and arranged so that it prevents a lateral movement of the vehicle seat with respect to the installation position of the vehicle seat in the vehicle, and thus supports a controlled force reduction and targeted guidance of the vehicle seat in the event of a crash.

A further embodiment of the device for selectively controlling and reducing a backward movement of a vehicle seat in the event of an accident has a stop element 14 welded onto an upper seat rail 13 and a stop body 17, having a contact face 18, formed at a seat link 16 as a beading.

Figure 2:
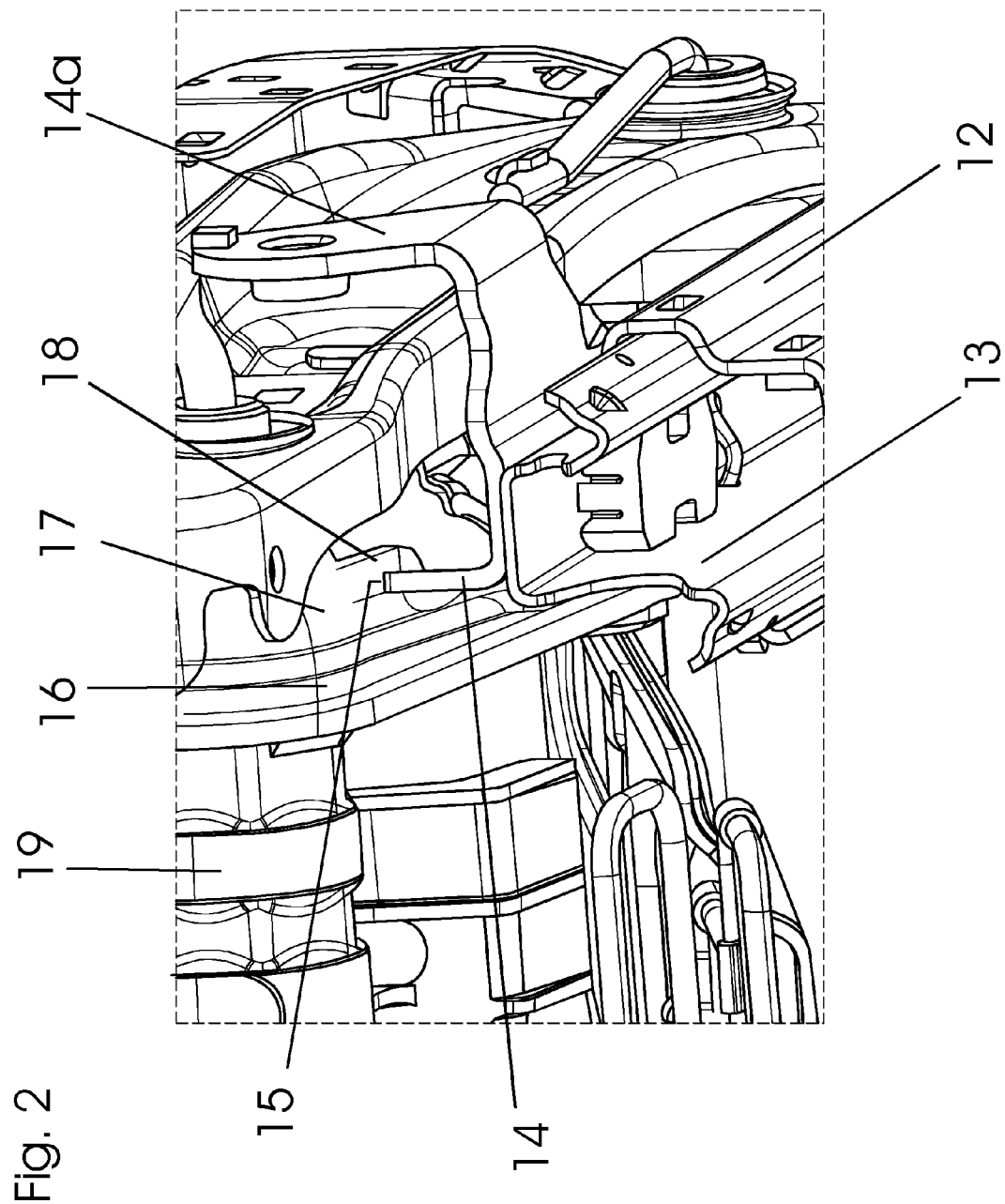
FIG. 2 is a perspective partial view of a second embodiment of a mounted stop body and stop element.

The contact face 18, as shown in a perspective view in FIG. 2, is designed and arranged so that in the event of a tail-end impact on the motor vehicle in which the device according to the invention is installed on a vehicle seat, it comes into contact with a stop face 15 with a rough surface structure arranged on the stop element 14. The contact between the contact face 18 and the stop face 15 prevents or respectively reduces the backward movement and the downward movement of the vehicle seat frame 19 relative to the installation position of the vehicle seat in the vehicle, and enables a further force transfer between the vehicle seat and the seat rail into the system which leads to a reduction of the load on the remaining connection means for fastening the vehicle seat.

Here, the stop face 15 is designed nearly parallel to the upper seat rail 13 so that in this embodiment in the event of a tail-end impact accident, initially the downwards movement of the vehicle seat in the direction of the vehicle floor is prevented, and a backwards movement of the vehicle seat is prevented then by the static friction between the stop face 15 and the contact face 18.

Furthermore, the stop element 14 is formed so that at least in the crash position in which the contact face 18 and the stop face 15 are in contact, a part of the seat frame 19 is embedded between the raised side of the stop element 14, at which the stop face 15 is located, and a further retaining element 14a, which is part of the stop element 14, and is surrounded thereby on both sides, whereby a lateral movement with respect to the installation position of the vehicle seat is prevented.

In a further exemplary embodiment, a stop body 27 is designed as a beading of a seat link 26 of a vehicle seat, wherein the seat link 26 has an elongated hole-like recess 31. Two cross-sections through an appropriate stop body 27 and a corresponding stop element 24 are shown in the FIGS. 3 and 4, wherein FIG. 4 shows a view of the construction elements rotated by 90° with respect to the view of FIG. 3.

The stop element 24 has a stop face, in the center of which it has a projecting pin 34. Here, the stop face 25 is formed sloping down from the pin 34 projecting therefrom towards the outer edges of the stop face 25.

Figure 3:
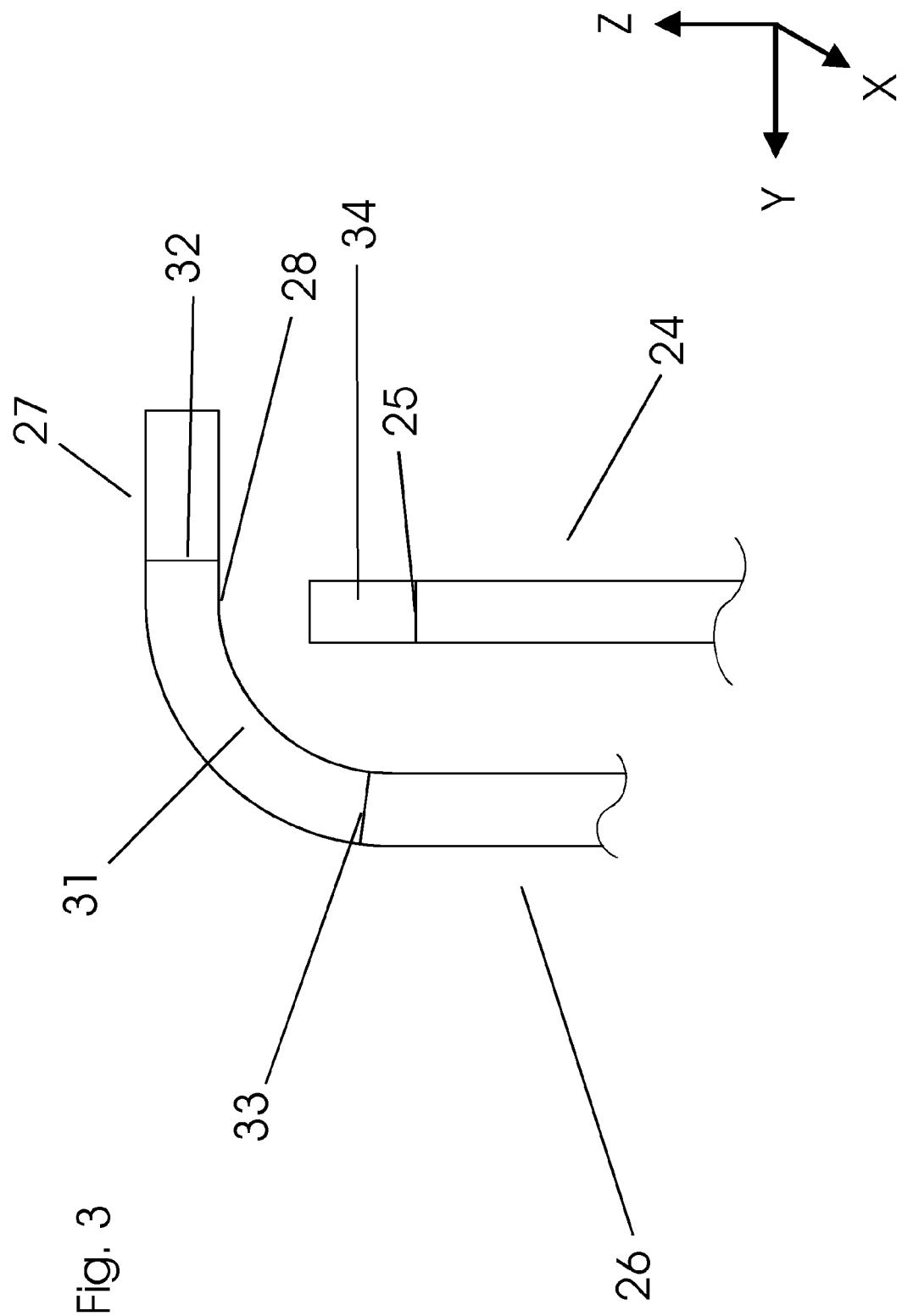
FIG. 3 is a schematic cross-sectional view through a third embodiment of a seat link having a stop body and a stop element.
Figure 4:
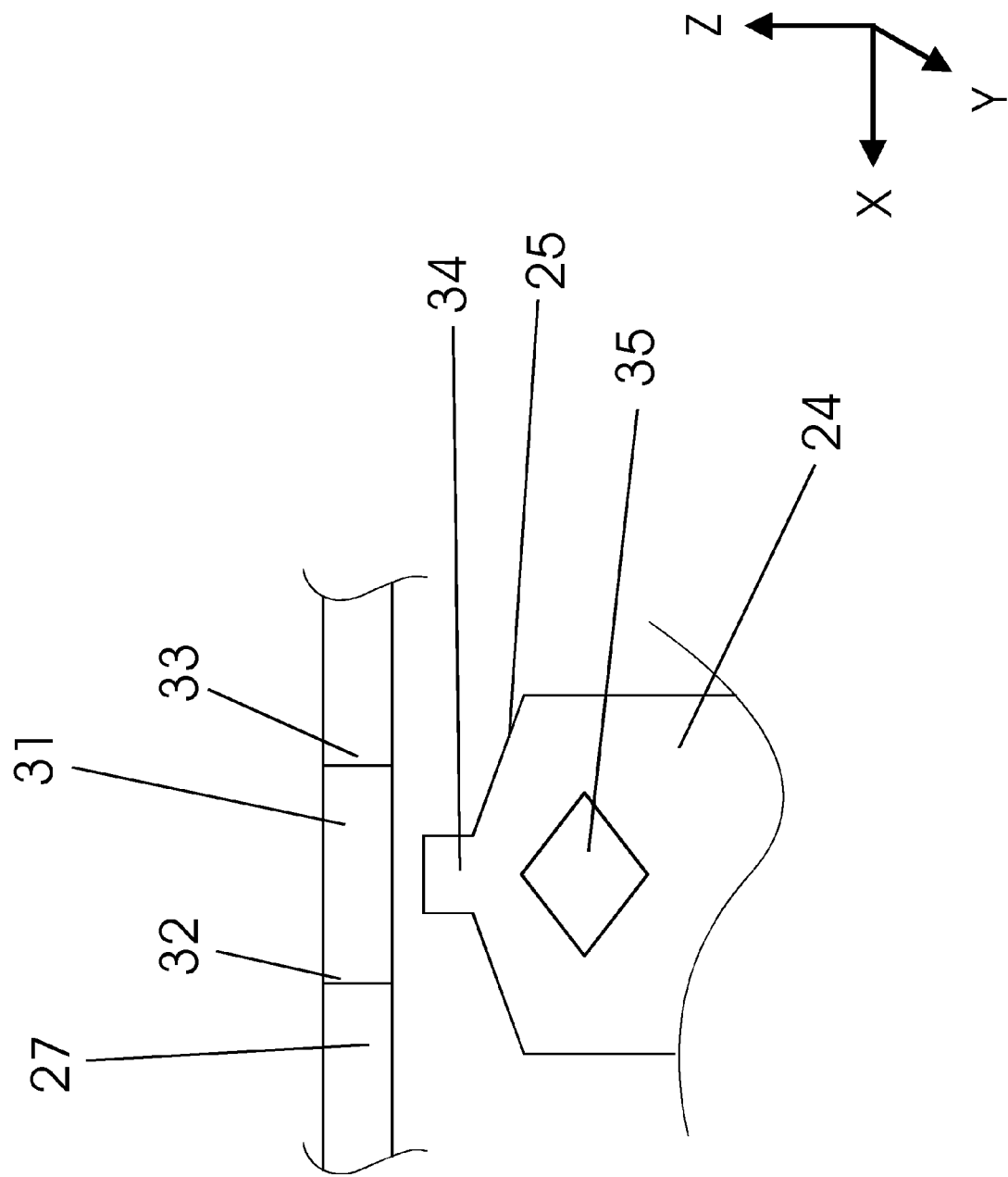
FIG. 4 is a schematic cross-sectional view through a third embodiment of a stop body with recess and a stop element with pin and deformation zone.

In the case of a tail-end impact, a vehicle seat, not shown in the FIGS. 3, 4, transitions from the normal position into the crash position, wherein the seat link 26 connected to the vehicle seat moves in the direction of the rear of the vehicle and the vehicle floor due to the forces caused by the accident acting on the vehicle seat. Here, the pin 34 of the stop element 24 engages with the hole-like recess 31 in the seat link 26, so that effectively a movement of the vehicle seat in the direction of the rear of the vehicle or in a lateral direction relative to the installation position of the vehicle seat, is prevented due to the contact of the pin 34 with one of the lateral edges 32, 33 of the hole-like recess 31.

During transition of the vehicle seat from the normal position into the crash position, in addition to the engagement of the pin 34 in the hole-like recess 31, a contact face 28 at the stop body 27 also comes into contact with the stop face 25 of the stop element 24, whereby a movement of the vehicle seat in the direction of the vehicle floor is also prevented.

Due to the contact of the two faces 25, 28 and the engagement of the pin 34 in the hole-like recess 31, a backward displacement of the vehicle seat is nearly completely eliminated and a particularly efficient transfer of force from the stop body 27 to the stop element 24 is guaranteed.

Furthermore, the stop element 24 has a deformation element in the form of a recess 35 which has a diamond-shaped cross-section and completely penetrates the stop element 24.

The shape of the recess 34 is designed so that in the case of an accident there is a controlled deformation of the stop element 24, whereby the acceleration forces acting on the vehicle seat are reduced as a part of the targeted energy management, and thereby the risk of injury to a vehicle occupant on the vehicle seat can be effectively reduced.

While specific embodiments of the invention have been shown and described in detail to illustrate the application of the principles of the invention, it will be understood that the invention may be embodied otherwise without departing from such principles.

The invention claimed is:

1. A device for selectively controlling and reducing backward displacement of a seat in a vehicle relative to a vehicle floor in the event of an accident, the device comprising;
   a stop element arranged on a pair of seat rails, said stop element having a stop face which is inclined with respect to a longitudinal axis of said pair of seat rails; and
   a stop body arranged on the vehicle seat and having a contact face, said contact face being arranged in a normal position at a distance from said stop face, said stop element and said stop body being arranged in a mounted state with respect to each other so that in a crash position which occurs during an impact on the vehicle, said stop face of said stop element and said contact face of said stop body enter into contact, as a result of the contact, backward displacement of the seat which is caused by the impact is at least reduced, said stop element having a deformation zone in a form of an opening which during transition from the normal position into the crash position causes a targeted deformation of said stop element, wherein said opening is in a region of the stop face, wherein a cross-sectional area of the opening orthogonal to an adjustment direction of the pair of seat rails is formed diamond-shaped.

2. The device according to claim 1, wherein:
said stop body is integral with a component of a vehicle seat frame of the seat.

3. The device according to claim 2, wherein:
said stop body is a beading of a seat link of the seat.

4. The device according to claim 1, wherein:
said stop element has a further retaining element.

5. The device according to claim 1, wherein:
said stop body in a region of said contact face defines a stop body opening;
said stop element has a pin projecting from said stop face, said stop body opening and said pin being arranged so that in the crash position, said pin projecting from the stop face comes into engagement with said stop body opening in a region of said contact face, said stop face being arranged at an angle relative to said pin, wherein said stop face extends from a first position located adjacent to said pin to a second position located at a spaced location from said pin, wherein said first position is located at a height that is greater than a height of said second position with respect to a longitudinal axis of said stop element.

6. The device according to claim 5, wherein:
said stop body is integrally connected to a seat link of a vehicle frame of the vehicle seat.

7. The device according to claim 6, wherein:
said opening of said stop element completely penetrates said stop element.

8. The device according to claim 5, wherein:
said opening of said stop element penetrates more than half a length of said stop element parallel to said adjustment direction of said pair of seat rails.

9. The device according to claim 5, wherein:
said opening of said stop element completely penetrates an entire length of said stop element parallel to said adjustment direction of said pair of seat rails.

10. The device according to claim 5, wherein:
said opening of said stop element is defined by at least a first side of said stop element and a second side of said stop element;
said first side is opposite said second side;
said first side is parallel to said second side.

11. The device according to claim 1, wherein:
said stop face is formed flat.

12. The device according to claim 11, wherein:
said stop face has a rough surface structure.

13. The device according to claim 1, wherein:
said stop face has a rough surface structure.

14. The device according claim 1, wherein:
said stop face is inclined with respect to a longitudinal axis of said pair of seat rails by 15° to 55°.

15. The device according claim 1, wherein:
said stop face is inclined with respect to a longitudinal axis of the pair of seat rails by 25° to 45°.

16. The device according to claim 1, wherein:
said contact face and said stop face are arranged parallel to each other in said normal position.

17. The device according claim 1, wherein:
said contact face is formed corresponding to a shape of said stop face.

18. A seat arrangement for a vehicle, the arrangement comprising:
   a vehicle seat mounted on a floor of the vehicle;
   a safety system in the vehicle, said safety system protecting an occupant of the seat within a safety range of positions of the seat when an impact force exceeding a predetermined amount is applied to the vehicle;
   a support system supporting said vehicle seat in the vehicle, said support system including a stop element and a stop body, said stop element being arranged closer to the floor of the vehicle than said stop body, said stop body being arranged closer to said vehicle seat than said stop element, said stop element having a stop face, said stop body having a contact face, said stop face and said contact face being spaced from each other in a first state of the seat arrangement, said stop face and said contact face being arranged to contact each other in a second state of the seat arrangement, said second state occurring when the impact force is applied to the vehicle, said stop face and said contact face contacting each other in said second state to block movement of said vehicle seat out of said safety range when said impact force is applied to the vehicle, wherein said stop face and said contact face block backward displacement of said vehicle seat in said second state, said stop element having an area of less material relative to an adjacent area of said stop element, said area of less material defining a deformation zone which during transition from said first state into said second state causes a targeted deformation of said stop element, wherein a cross-sectional area of said area of less material orthogonal to an adjustment direction of the pair of seat rails is formed diamond-shaped.

19. A seat arrangement in accordance with claim 18, wherein:
said area of less material comprises a stop element opening;
a cross-sectional area of said stop element opening orthogonal to an adjustment direction of said pair of seat rails is diamond-shaped.

20. A seat arrangement in accordance with claim 19, wherein:
said contact face defines a stop body opening;
said stop element includes a pin projecting from said stop face;
said stop body opening and said pin are arranged to have said pin engage said stop body opening in said second state; said stop element opening completely penetrates said stop element;
one side of said stop element and another side of said stop element define at least a portion of said stop element opening;
said one side is located opposite said another side;
said one side is parallel to said another side;
said stop face is arranged at an angle relative to said pin;
said stop face extends from a first position located adjacent to said pin to a second position located at a spaced location from said pin;
said first position is located at a height that is greater than a height of said second position with respect to a longitudinal axis of said stop element;
said stop element and said stop body are arranged to absorb energy from relative movement of the seat with respect to the floor when said stop face and said contact face contact each other;
said stop face comprises a planar stop surface;
said contact face comprises a planar contact surface;
said planar stop surface is in contact with said planar contact surface in said second state.

* * * * *